(12) United States Patent
Knox

(10) Patent No.: US 6,168,360 B1
(45) Date of Patent: Jan. 2, 2001

(54) TIEDOWN HOOK AND RAIL

(75) Inventor: Howard T. Knox, Lawrence, KS (US)

(73) Assignee: The Shane Group, Inc., Hillsdale, MI (US)

( * ) Notice: Under 35 U.S.C. 154(b), the term of this patent shall be extended for 0 days.

(21) Appl. No.: 09/507,641

(22) Filed: Feb. 22, 2000

(51) Int. Cl.[7] ........................................... B60P 7/08
(52) U.S. Cl. ............... 410/96; 410/97; 410/108; 410/110; 410/115; 410/116
(58) Field of Search .................. 410/11, 96, 97, 410/101, 106, 108, 110, 115, 116; 24/68 CD, 265 CD; 248/499

(56) References Cited

U.S. PATENT DOCUMENTS

| | | |
|---|---|---|
| 1,746,707 | 2/1930 | Mallory . |
| 2,346,099 | 4/1944 | Wilson . |
| 3,665,562 | 5/1972 | Gower . |
| 3,668,746 | 6/1972 | Gower . |
| 4,083,312 * | 4/1978 | Holman, Jr. ........................ 410/97 |
| 4,256,338 | 3/1981 | McLennan . |
| 5,516,246 * | 5/1996 | Helton .................................. 410/101 |
| 5,807,045 * | 9/1998 | Profit ................................... 410/116 |
| 5,967,720 * | 10/1999 | Profit ................................... 410/116 |
| 5,993,127 * | 11/1999 | Shinn .................................. 410/100 |

* cited by examiner

Primary Examiner—Stephen T. Gordon
(74) Attorney, Agent, or Firm—Young & Basile, P.C.

(57) ABSTRACT

A hook and rail for use with tensioned webs and the like wherein the hook is defined by an opening in a stamped plate body having a throat through which a rail is received when the hook is angularly oriented to the rail in a particular manner. The hook body has a tension axis and the dimension of the hook throat parallel to the tension axis is less than the dimension of the rail in the direction of the tension axis during hook operation. The hook opening includes a recess and a guide surface whereby upon release of the tension in the web, and movement of the hook under gravity, positions the rail in the opening recess maintaining the anchor captured within the hook opening and the rail configuration prevents disengagement of the hook unless the hook is rotated through a specific motion.

9 Claims, 2 Drawing Sheets

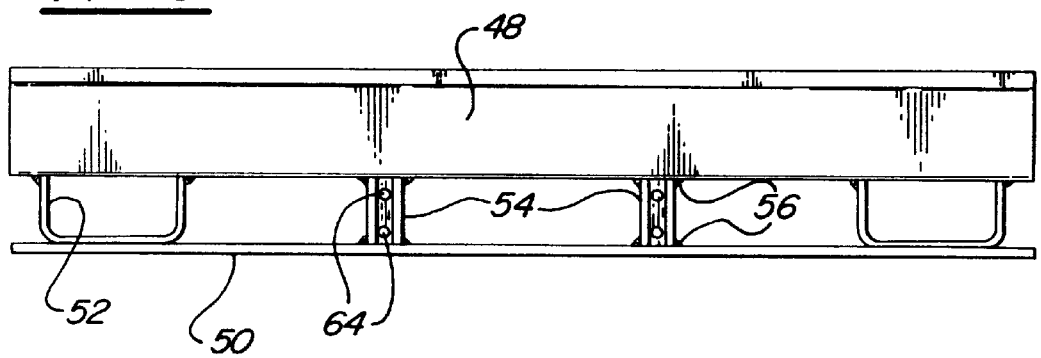
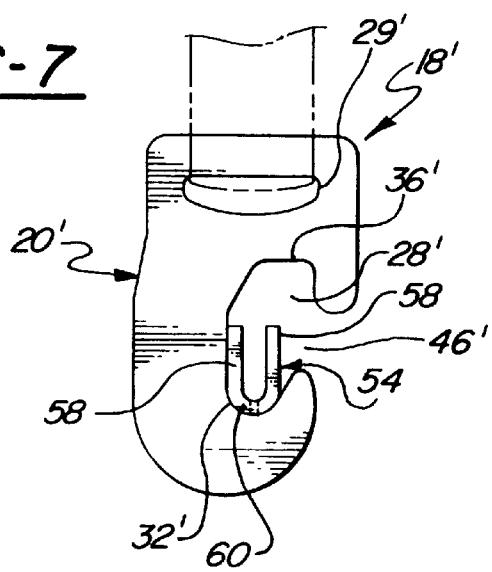
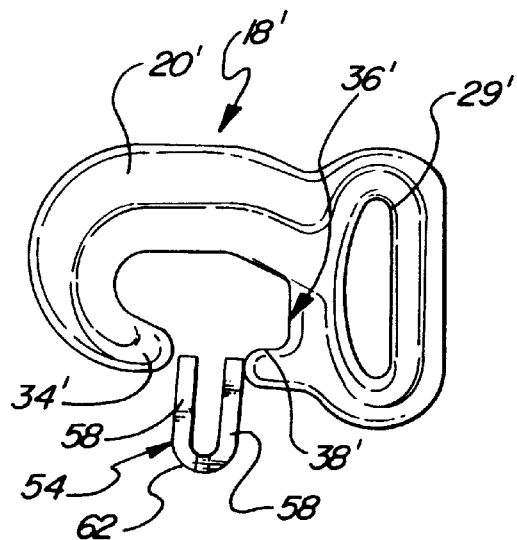

TIEDOWN HOOK AND RAIL

BACKGROUND OF THE INVENTION

1. Field of the Invention

The invention pertains to hooks adapted to be located on tension members and associated with rails or anchor bars of predetermined configuration wherein the relationship between the anchor bar and the hook is such that the rail or anchor bar remains in the hook until the operator requires hook release.

2. Description of the Related Art

Hooks are commonly used with straps and webs to anchor the strap for tensioning purposes. Such straps are often used with trucks to hold the load on the truck bed during transit. Web straps are capable of withstanding high tension forces as produced by small web winches or tighteners, and the hooks are usually attached to rail pins or anchors located in the truck bed, often adjacent the truck bed edges.

One of the problems with hooks for tension members, particularly when holding down loads on vehicles, is that, upon the web being untensioned, or losing its tension, the hook accidentally releases from its rail pin. This problem is particularly troublesome when initially positioning the webs and hooks, or when the load web straps are being re-positioned on the load and must have the tension released therefrom prior to re-tightening.

Strap hook retainers for vehicle loads are shown in U.S. Pat. Nos. 5,388,938 and 5,516,246. However, these devices are expensive and cumbersome, and relatively complicated to operate.

It is known to shape the hooks of tension members in such a manner as to reduce the likelihood of inadvertent release of the hook and its rail pin. Attention is drawn to U.S. Pat. Nos. 1,746,707; 2,346,099; 3,665,562; 3,668,746; and 4,256,338. However, the hooks shown in these patents are not suitable for use with webs holding down vehicle loads, and there is a need for a web or strap hook which is of low cost, easy to use, does not use pivoted locks, latches or complicated anchor retainers, but yet does not permit the hook to become inadvertently disengaged from its rail upon tension in the strap being released.

OBJECTS OF THE INVENTION

It is an object of the invention to provide a strap hook of economical construction which includes a hook opening of a particular configuration that permits the hook to be readily attached to an anchor bar or rail pin, but inadvertent disconnection from the rail pin is highly unlikely.

Another object of the invention is to provide a strap hook of a low cost plate construction which does not require locks, latches or secondary elements to maintain association between the hook and its rail pin upon release of strap tension.

A further object of the invention is to provide a strap hook having a hook opening of a particular configuration and dimensional relationship to the hook rail anchor which prevents the hook from disengaging from its rail anchor unless the hook is angularly oriented to the rail anchor in a purposeful manner.

SUMMARY OF THE INVENTION

A strap hook utilizing the concepts of the invention is preferably formed by a stamping process of sheet steel, for instance of approximately ¼ inch thickness. However, a hook utilizing the inventive concepts can be formed by casting, injection molding, machining, etc.

The hook includes a body which, for purposes of orientation and description, will be referred to as having an upper region and a lower region. An eye is defined in the hook upper region which is usually of an elongated configuration as to receive a conventional tensioning web. Of course, the eye could be of a circular configuration for receiving a chain link, or clevis, the particular configuration of the eye forming no part of the inventive concept. Tension is imposed upon the hook body through the tension member associated with the eye, and a vertical tension axis will be defined in the body upon a vertical tension force being applied to the tension member associated with the eye.

A hook is defined in the lower region of the body, and the hook is formed by an opening defined in the body which intersects a body vertical edge wherein this intersection defines a throat. The hook opening lowermost surface forms an anchor bearing or engageable surface which will lie upon the tension axis so that the hook body will be vertically oriented when affixed to an anchor bar or rail pin and under tension.

Further, the hook opening includes a recess disposed toward its upper region in substantially opposed relationship to the rail or anchor engaging surface and of a shape and dimension to receive the rail pin or anchor when tension is released on the tension member. A guide surface interconnects the hook rail engaging surface and the recess to guide the rail into the recess upon release of web tension.

The throat defined in the hook body by the opening is formed by a convex radiused hook point, and the recess defines a downwardly extending convex radiused brow in substantially opposed and spaced relationship to the hook point. The dimension between the hook point and the brow constitutes the dimension of the throat or access to the hook opening.

The rail pin or anchor with which a hook in accord with the invention is normally associated is attached to or constitutes a portion of a truck bed body. This anchor may constitute a short pin of generally oblong cross sectional configuration. The anchor rail pin "top" surface disposed toward the web slot is of a generally flattened shape with radiused corners which corresponds to the shape of the recess. The anchor rail pin includes a vertical height of given dimension and a horizontal width of given dimension.

The vertical dimension of the hook body throat is less than the vertical dimension of the anchor rail pin. However, the given width of the anchor rail pin is less than the dimension of the hook throat. Further, the horizontal width of the hook body opening, and opening recess, is greater than the width of the anchor rail pin, and the vertical dimension of the hook body opening between the anchor engaging surface and the uppermost portion of the opening recess, is greater than the vertical dimension of the anchor rail bar.

Thus, when the web is untensioned, it is possible to angularly orient the hook body approximately 90° relative to the anchor rail pin to slip the anchor rail pin into the hook throat, or remove the body from the anchor rail pin. The degree of angular orientation of the hook body required to pass the anchor rail pin through the hook throat is such that this angular orientation is not likely to occur during hook use, and a predetermined and purposeful effort is required to insert the anchor rail pin through the hook opening, or remove the anchor rail pin therefrom.

When the hook is in engagement with the anchor rail pin, tension of the web will hold the rail pin into firm engagement with the hook anchor rail pin engaging surface. In the event that tension is released on the web, the weight of the hook permits the hook to "fall" onto to the anchor rail pin. The guide surface defined in the hook opening is obliquely oriented to the tension axis and guides the hook relative to the anchor rail as it moves downwardly so that the anchor rail is received within the recess. Because the recess brow extends below the upper portion of the anchor rail, the anchor rail will be firmly retained within the hook opening even though tension on the strap has been released. Thereupon, upon tension being restored to the strap, the hook body will raise and the hook will engage the anchor rail at the anchor rail engaging surface.

Because the upper anchor rail surface and upper recess surface engaged by the anchor bar are generally flat, the hook will rest upon the anchor rail and the hook construction prevents the hook and anchor rail from inadvertently disengaging, eliminates the need for locks, latches and spring biased abutments or stops, and yet prevents many of the annoying disengagements between hooks and anchor rails that presently occur. A hook constructed in accord with the inventive concepts fulfills all of the aforementioned objects.

BRIEF DESCRIPTION OF THE DRAWINGS

The aforementioned objects and advantages of the invention will be appreciated from the following description and accompanying drawings wherein:

FIG. 6 is a plan view of an embodiment of anchor rail pins wherein the pins are formed of steel, FIG. 7 is an enlarged elevational view of the hook of the invention with the anchor rail pin of FIG. 6 in the web tensioned position, and FIG. 8 is an elevational view illustrating the angular orientation of the hook relative to the anchor rail pin of FIGS. 6 and 7 for inserting or removing the anchor rail pin from the hook opening.

DESCRIPTION OF THE PREFERRED EMBODIMENTS

While a hook in accord with the invention can be used with any type of tension member such as a cable, chain, rope or web strap, it is most commonly used with web straps for tying down loads on truck beds. Accordingly, the hook will be described in this environment.

Figure 1:
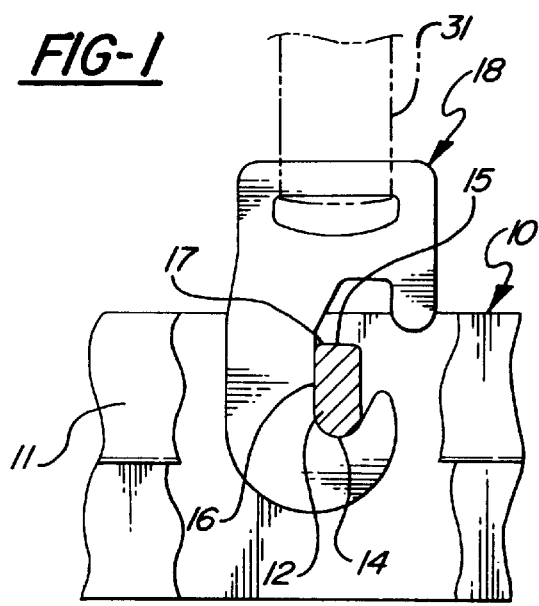
FIG. 1 is an elevational view, partially sectioned, illustrating a strap hook in accord with the invention as utilized with an anchor bar in accord with the invention.
Figure 2:
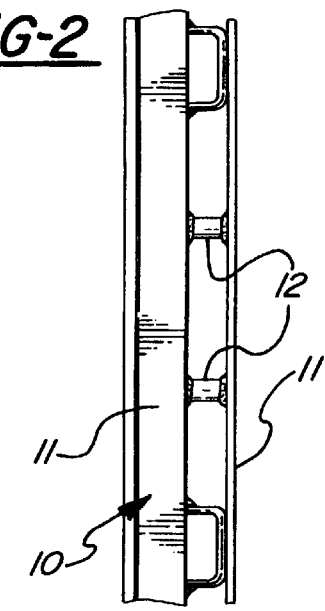
FIG. 2 is a plan view of the anchor rail pins of FIG. 1.

In the drawings, a typical truck bed is shown at 10 and such truck bed will usually include steel side rails 11, one of which comprises a rub rail, which have bar-type anchor rail bars 12 welded between them. FIG. 1 illustrates a typical truck bed anchor rail bar having a lower convex radiused end 14, a flat upper end 15, radiused corners 17, and vertically disposed flat sides 16.

Figure 3:
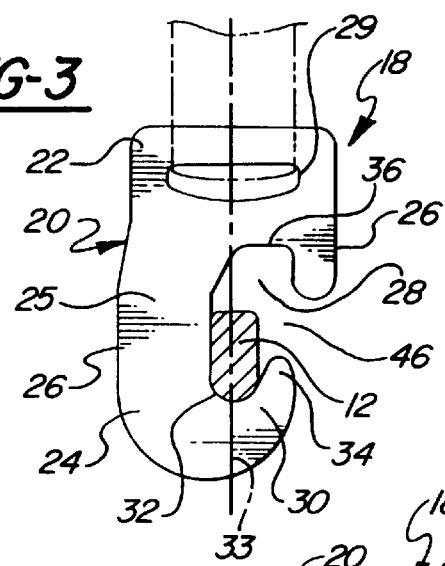
FIG. 3 is an enlarged elevational view of the hook of the invention with the anchor rail pin in the web tensioned position.
Figure 4:
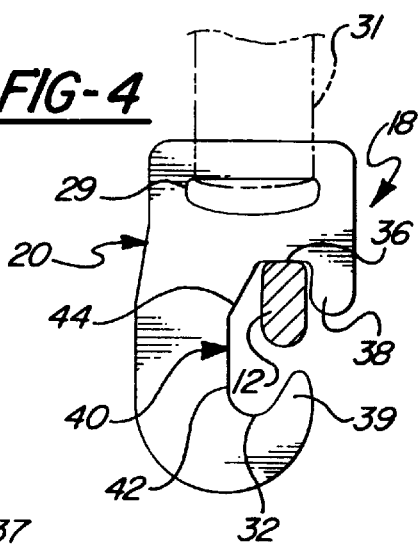
FIG. 4 is an enlarged view of the hook illustrating the anchor pin in the web untensioned position.
Figure 5:
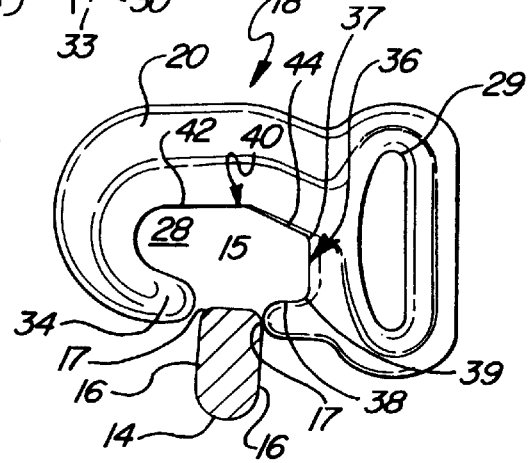
FIG. 5 is an elevational view illustrating the angular orientation of a forged hook relative to the anchor pin for inserting or removing the anchor pin from the hook opening.

The hook, generally indicated at 18, is preferably formed as a stamping from heavy sheet metal, such as ¼ inch steel plate, or the like, as shown in FIGS. 1–4. However, the inventive concepts of the invention can be utilized with hooks formed by molding, casting, forging, fabrication or machining, as shown in FIG. 5. The particular method for forming the hook body configuration constitutes no part of the present invention.

The hook body 20 includes an upper region 22 and a lower region 24 defining a central region 25 therebetween. The central region 25 is laterally defined by spaced sides 26 and an opening 28 is defined in the hook body central region 25 intersecting the right side 26 as apparent from FIGS. 1 and 3. At its upper region 22, the hook body is provided with an eye 29 in the form of a slot for receiving the tension member, such as the web 31 shown in phantom lines.

The lower region 24 includes a hook portion 30 defined by the configuration of the opening 28. The hook portion 30 includes an anchor engageable surface 32 and a terminating end 34 adjacent the right hook body side 26, FIG. 1. The end 34 is of a convex radiused configuration.

The center of the anchor engageable surface 32 and the center of the eye 29 define a vertically disposed tension axis 33 vertically extending through the center of the body 20.

The opening 28 includes a recess 36 defined just below the eye 29 of a flat configuration bounded by radiused corners 37 and 39, as will be appreciated from FIG. 3. The recess 36 is of a configuration substantially corresponding to that of the upper surface 15 of the anchor bar 12, and the recess 36 includes a surface extending downwardly and convexly radiused to define a transition surface or brow 38 intersecting the right hook body side 26. Further, the opening 28 includes a guide surface 40 having a lower portion 42 of a substantially linear configuration tangentially blending into the concave anchor engageable surface 32, and the guide surface 40 includes an obliquely disposed surface 44 extending from the upper portion of the surface 42 to tangentially intersect the recess radius 37.

The hook terminating end 34 and the recess transition brow 38 define a throat 46 in the side of the hook body providing access to the opening 28. The vertical dimension of the throat 46 is less than the vertical dimension of the anchor rail bar 12 as defined by the ends 14 and 15, and accordingly, when the transition axis 33 is substantially vertically oriented, as is the case when tension is on the web 31, the anchor rail bar 12 cannot pass through the throat 46, and the anchor rail bar and hook 18 will not be inadvertently disengaged.

Assuming the orientation of the hook 18 to be as shown in FIGS. 1 and 3, release of tension in the web 31, such as may be necessary to reposition the web, adjust the load, or the like, causes the hook body 20 to move downwardly toward the anchor rail bar pin 12 under gravity. Such vertical displacement of the hook body 20 causes the guide surface 40 to align the recess 36 with the anchor rail bar 12 causing the anchor rail bar 12 to be received within the recess 36 as shown in FIG. 4 wherein the surfaces 15 and the flat surface of recess 36 engage. The fact that the transition surface 38 is below the concave configuration of the recess 36, the hook 18 will be firmly positioned and resting on the anchor rail bar 12 so that when tension in the web 31 is restored, the hook body 20 will move upwardly relative to the bar 12 and the anchor rail bar will engage the hook surface 32 as shown in FIGS. 1 and 3. The fact that the vertical dimension of the anchor rail bar 12 is greater than that of the throat 46 prevents such vertical movement of the hook body from disengaging from the anchor rail bar.

The width of the anchor rail bar 12 as defined by the sides 16 is less than the dimension between the hook terminating end 34 and the brow transition surface 38. Accordingly, when tension is released from the web 31, it is possible for the operator to pivot the hook body 90° in a clockwise direction such as shown in FIG. 5 permitting the anchor rail bar to pass through the throat 46 disconnecting the hook and anchor bar. Of course, when initially placing the hook body on the anchor rail bar, this angular orientation of the hook shown in FIG. 5 is also necessary in order to receive the anchor rail bar through the throat 46 and into the opening 28.

In FIGS. 1–5, the anchor rail bars or pins 12 are shown as formed as a solid piece. Such rail anchor pins 12 may be formed of forged or cast steel, or formed as an aluminum extrusion. As many truck trailer rails are formed of aluminum, the use of the solid aluminum anchor rails is practical. However, many trailer side rails are formed of steel, and while a molded or forged steel anchor rail pin could be used with steel trailer side rails, the invention contemplates the use of a fabricated, low cost anchor rail pins or bars as shown in FIGS. 6–8.

With reference to FIG. 6, a steel trailer side rail 48 includes a spaced steel rub rail 50 welded to stake pockets 52 which are in turn welded to the rail 48. The steel rail anchor pins 54 are inserted between the rails 48 and 50 and welded thereto at 56 along the walls of the anchor rail pin.

The anchor rail pins 54 are formed of steel sheet metal bent into a U configuration defining parallel spaced walls 58 interconnected by a convex base 60, as will be appreciated from FIGS. 7 and 8.

The base 60 has a lower radiused surface 62, and a pair of drain holes 64 are drilled in the base 60 so that rainwater will not be trapped within the rail anchor pins 54.

Because the rail anchor pins 54 are welded to the truck rails 48 and 50 at 56, the rail anchor pins 54 will be firmly mounted upon the rails 48 and 50, and the rail anchor pins 54 will cooperate with the identical hook 18' described with respect to FIGS. 1–5. In FIGS. 7 and 8, identical hook components to those previously described are indicated by primes.

The ends of the rail anchor pin walls 58 are of equal length, and, together, define a flat surface which will cooperate with the flat surface of the recess 36' when the hook web is not under tension. When the hook web is under tension, as shown in FIG. 7, the rail anchor pin surface 62 will be engaging the hook surface 32' in the previously described manner.

Of course, the width of the rail anchor pin walls 58 is less than the dimension of the hook throat 46' so that rotation of the hook 18' as shown in FIG. 8 permits the rail anchor pins 54 to be easily connected to, or removed from, the hook 18'. The fabricated construction of the rail anchor pins 54 substantially reduces the cost of these components without compromising the strength requirements of the rail anchor pins.

It will be appreciated that the inventive concepts of the invention permit a low cost anchor to be manufactured which effectively retains itself on its anchor bar even under no tension conditions.

It is appreciated that various modifications to the inventive concepts may be apparent to those skilled in the art without departing from the spirit and scope of the invention.

What is claimed is:

1. A hook and anchor rail bar system for removable connection of a hook to an anchor rail bar, comprising an anchor rail bar having a given length and a given width, a hook including a body, an eye defined on said body for attachment to a tension member, said eye defining a substantially vertical-tension axis, said body including a side, a central region and an end remote from said eye, an opening defined in said body central region intersecting said side, said opening forming a hook portion extending toward said body end defining a hook having an anchor engageable surface in substantial alignment with said tension axis, said hook including a terminating end adjacent said body side partially defining the intersection of said opening with said body side, said opening including a recess in opposed relation to said hook anchor engageable surface whereby lack of tension imposed on said eye will permit said recess to receive and hold the anchor rail bar, said recess defining a transition surface intersecting said body side and in spaced opposed relation to said hook terminating end, said hook terminating end and said transition surface forming a throat in said opening, said throat having a dimension in a direction substantially parallel to said tension axis less than said anchor rail bar given length and greater than said anchor rail bar given width, said opening including a guide surface extending from said anchor engageable surface to said recess to guide the anchor rail bar into said recess, said opening being of sufficient width transverse to said tension axis to permit said body to be rotated to align said throat with the anchor rail bar width to insert and remove the anchor rail bar from said body opening.

2. In a hook and anchor rail bar system as in claim 1, said guide surface being obliquely oriented to said tension axis.

3. In a hook and anchor rail bar system as in claim 1, said eye comprising an elongated slot transverse to said tension axis for receiving a web.

4. In a hook and anchor rail bar system as in claim 1, said hook terminating end and said opening transition surface comprising convex radiused surfaces.

5. In a hook and anchor rail bar system as in claim 1, said anchor rail bar having a surface disposed toward said recess complementary in configuration to said recess.

6. In a hook and anchor rail bar system as in claim 5, said anchor rail bar surface being flat having tangential intersecting corner convex surfaces and said recess being flat having longitudinal intersecting concave corner surfaces.

7. In a hook and anchor rail bar system as in claim 3, said anchor rail bar being formed of plate material having substantially parallel legs of equal length interconnected by an arcuate base having an outer convex radiused surface, said radiused surface being engageable with said hook anchor engageable surface.

8. In a hook and anchor rail bar system as in claim 7, with ends of said anchor rail bar walls defining a flat surface engageable with said recess upon a lack of tension being imposed upon said eye.

9. In a hook and anchor rail bar system as in claim 8, a drain hole defined in said anchor rail bar base.

* * * * *

UNITED STATES PATENT AND TRADEMARK OFFICE
CERTIFICATE OF CORRECTION

PATENT NO. : 6,168,360 B1  
DATED : January 2, 2001  
INVENTOR(S) : Howard T. Knox Page 1 of 1

It is certified that error appears in the above-identified patent and that said Letters Patent is hereby corrected as shown below:

The name of the Assignee is corrected to read
-- Kinedyne Corporation of North Branch, NJ (US) --.

Signed and Sealed this

Twenty-ninth Day of January, 2002

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,168,360 B1
APPLICATION NO. : 09/507641
DATED : January 2, 2001
INVENTOR(S) : Howard T. Knox It is certified that error appears in the above-identified patent and that said Letters Patent is hereby corrected as shown below:

Title page item 73
Change "Assignee: The Shane Group, Inc., Hillsdale, MI (US)" and replace with
-- Assignee: Kinedyne Corporation, North Branch, New Jersey (US) --

Signed and Sealed this

Ninth Day of September, 2008

JON W. DUDAS
*Director of the United States Patent and Trademark Office*